United States Patent [19]

Schlosser

[11] Patent Number: 5,711,389
[45] Date of Patent: Jan. 27, 1998

[54] TANDEM REAR DRIVE AXLE ASSEMBLY

[75] Inventor: Kraig J. Schlosser, Ft. Wayne, Ind.

[73] Assignee: Dana Corporation, Toledo, Ohio

[21] Appl. No.: 552,912

[22] Filed: Nov. 3, 1995

[51] Int. Cl.⁶ .................................................. B60K 17/36
[52] U.S. Cl. ............................ 180/197; 180/24.1; 180/247; 192/85 CA; 192/103 F; 74/665 GA; 74/665 G
[58] Field of Search ................... 180/24.1, 24.11, 180/24.12, 24.09, 24.08, 197, 233, 247, 338, 345; 192/85 CA, 103 F; 475/222, 208, 199; 74/665 GA, 665 G, 665 GC, 665 T, 665 P

[56] References Cited

U.S. PATENT DOCUMENTS

| | | | |
|---|---|---|---|
| 2,537,400 | 1/1951 | Drong | 180/24.1 |
| 2,914,128 | 11/1959 | Christie | 180/24.1 |
| 3,000,456 | 9/1961 | Christie | 180/24.09 |
| 3,627,072 | 12/1971 | Smirl | 180/24.09 |
| 3,780,821 | 12/1973 | Prange | 180/24.09 |
| 4,046,210 | 9/1977 | Nelson | 180/24.1 |
| 4,773,500 | 9/1988 | Naito et al. | 180/233 |
| 5,215,160 | 6/1993 | Williams et al. | 180/197 |
| 5,323,871 | 6/1994 | Wilson et al. | 180/197 |

Primary Examiner—Brian L. Johnson
Assistant Examiner—Peter C. English
Attorney, Agent, or Firm—Oldham & Oldham Co., LPA

[57] ABSTRACT

Tandem rear axle assembly for motor vehicles, especially trucks. The tandem rear axle assembly herein does not employ an inter-axle differential. Instead, torque is transmitted from a motor drive shaft to a longitudinally extending through shaft, which may drive a differential for a rearward rear axle. A forward rear axle is selectively engaged or disengaged, as driving conditions require, by a disk-type friction clutch or clutch pack. The clutch pack may be actuated by an actuator assembly which includes sensors for determining the rotational speeds of the two rear axles, and a computer controlled unit or signal generator for generating an output signal when the difference in rotational exceeds a predetermined limit. The output signal actuates, for example, by air pressure, a piston which compresses the clutch pack so as to engage the clutch and thereby transmit torque to both the forward and rearward rear axles simultaneously. The clutch may be manually actuated if desired.

17 Claims, 3 Drawing Sheets

TANDEM REAR DRIVE AXLE ASSEMBLY

TECHNICAL FIELD

This invention relates to a drive axle assembly with multiple drive axles, such as tandem axle assemblies. More particularly, this invention relates to a tandem rear drive axle assembly which is capable of selectively driving either one or both axles without use of an interaxle differential.

BACKGROUND ART

Tandem axle assemblies are widely used on trucks and other heavy, load-carrying over-the-road vehicles, such as busses. A tandem axle assembly is usually located near the rear of a vehicle, and comprises two axially spaced axles, a forward rear axle and a rearward rear axle, and means to drive one of the axles full time while selectively engaging the other axle so that the power may be transmitted to both axles when needed.

A tandem rear axle assembly serves two main functions. The first is to distribute a heavy load between two axles so as to avoid excessive weight on a single axle. The second is to provide improved traction for adverse road conditions, such as ice, snow, or mud, or when a high torque is applied to a vehicle drive shaft, as for example because of a heavy load, a steep upgrade, or both.

Various tandem rear axle assemblies are known in the art. Many of these employ an interaxle differential and a differential lockout mechanism. The interaxle differential includes a pair of output gears, commonly called side gears, for transmitting an input torque to respective rear axles.

Other tandem rear axles operate such that input torque is transmitted full time to one of the rear axles and selectively (part time), as conditions require, to the other rear axle. Either the forward rear axle or the rearward rear axle may be the full-time drive axle. Both automatic and manual actuators for switching from one axle drive to two axle drive or vice versa are known in the art. Automatic actuators may employ speed sensors for determining the rotational speeds of the two axles, and a toothed dog clutch, such as a dog clutch for selectively engaging or disengaging the second axle. When the difference in rotational speeds of the two axles exceeds the predetermined amount, which can occur for example on ice or snow when one axle loses traction, and the other axle has good traction, the clutch is actuated and power is thereafter simultaneously transmitted to both rear axles.

Tandem rear axle assemblies employing gearing to perform the transition from one axle drive to two axle drive or visa versa is not particularly efficient, and better control over the system would be desirable to improve the ability to gain traction and to avoid excessive torque on a single axle.

SUMMARY OF THE INVENTION

This invention provides a novel tandem rear axle assembly for transmitting torque from a vehicle drive shaft to a first axle and selectively to both the first axle and the second axle. The drive axle assembly comprises an input shaft adapted to be in driving engagement at one end with a vehicle drive shaft and at a second end with a drive train for the first axle. The first drive train for driving the first axle is in full-time driving engagement with the input shaft, and a second drive train, for driving the second axle, is selectively placed into and out of engagement with the input shaft. A clutch pack is used to selectively engage and disengage the second drive train, and may comprise a plurality of annular disks arranged in inter-leaved first and second sets, the disks of the first set being driven by the input shaft and the disks of the second set drivingly engaging the second drive train. A clutch actuator assembly is used to automatically actuate the clutch when driving of the second axle is desired.

A preferred clutch actuator assembly comprises first and second speed sensors, for sensing the rotational speeds of the respective first and second axles. A control device is provided for generating an output signal when the difference in rotational speeds of the first and second axles exceeds a predetermined amount, and an axially moveable annular compression member disposed adjacent to an end face of the clutch pack is actuated in response to an output signal to compress the clutch pack and thereby place the second drive train and the second axle in driving relationship with the input shaft so that the torque is transmitted simultaneously to both axles. The actuator may then be used to disengage the clutch pack when increased traction is not needed, or when excessive torque is relieved.

An advantage of the present invention is that the shift from single axle drive to two axle drive or vice versa takes place smoothly and automatically in a tandem axle assembly without interaxle differential gearing used in previously known tandem axle assembly drive systems.

BRIEF DESCRIPTION OF THE DRAWINGS

The aforementioned advantage, as well as other advantages of the present invention, will become apparent from the subsequent detailed description of the preferred embodiment, when taken in conjunction with the accompanying drawings, in which.

DETAILED DESCRIPTION

Figure 1:
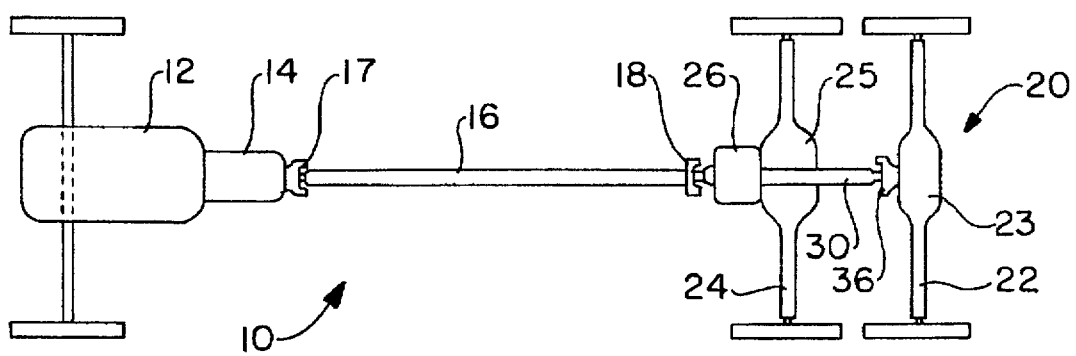
FIG. 1 is a schematic top-plan view of a vehicle having a tandem rear axle assembly according to this invention.

Referring now to the drawings, FIG. 1 illustrates an over-the-road vehicle having a tandem rear axle assembly according to this invention. Vehicle 10 has an engine 12 which is drivingly connected to a transmission 14. A main drive shaft 16 extends longitudinally from the transmission to a tandem rear axle assembly, and may be coupled at one end (the forward end) via a conventional coupling 17 (such as a yoke or universal joint) to the transmission and at the other or rearward end by another conventional coupling 18 to an input shaft of a tandem rear axle assembly 20.

Vehicle 10 may be any vehicle having a tandem axle assembly and is preferably a truck or other over-the-road vehicle (such as a bus) which has a tandem axle assembly comprising two axially spaced transversely extending axles. Tandem axle assembly 20 is usually located near the rear of a vehicle and is therefore referred to herein as a tandem rear axle assembly. Tandem rear axle assembly 20 comprises a first or rearward rear axle 22 which in turn comprises axially aligned right and left axle shafts which are driven through a first axle differential 23. A second or forward rear axle 24, which also comprises axially aligned right and left axle shafts, is driven through a second axle differential 25. The first or rearward rear axle 22 is in full-time driving engagement with the transmission 14 and main drive shaft 16. The second or forward rear axle 24 is adapted to be placed selectively in engagement with the transmission 14 and the main drive shaft 16, as will be hereinafter described. The axles 22 and 24 of the tandem rear axle assembly 20 herein are axially spaced apart but are in proximity with each other toward one end, i.e., the rear, of a vehicle.

All parts of both the vehicle 10 as a whole and the tandem rear axle assembly 20 described so far may be conventional.

Figure 2:
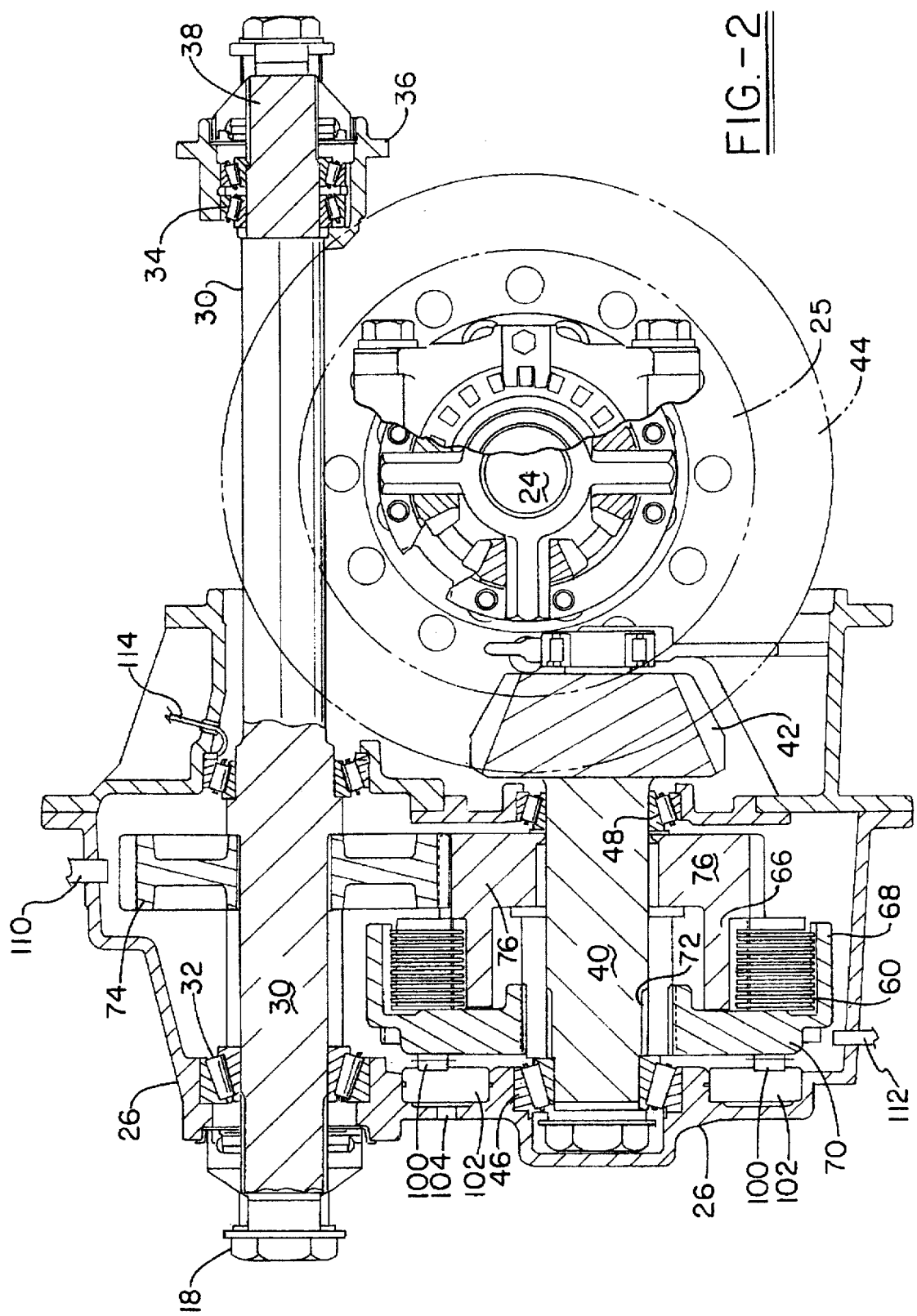
FIG. 2 is a longitudinal vertical sectional view of a preferred tandem rear axle assembly of this invention.

Referring now to FIG. 2, the tandem rear axle assembly 20 has a housing 26 (also shown in FIG. 1) at the forward end of the assembly. A longitudinally extending rotatable input shaft or through shaft 30 is rotatably supported at its forward end by means of bearing assemblies 32 inside housing 26. The through shaft 30 is coupled at its forward end to the main vehicle drive shaft 16 through coupling 18 in direct drive relationship. At its rearward end, the through shaft 30 is supported by means of a bearing assembly 34 and is coupled through a suitable coupling or universal joint 36 in direct drive relationship to a shaft 38, aligned with the through shaft 30. The rearward end of through shaft 30 is behind the forward rear axle 24 and, indeed, may be in proximity with the rearward rear axle 22. The shaft 38 is an input member for differential 23. Shaft 38 and differential 23 are parts of a first drive train for driving rearward rear axle 22. In the preferred embodiment illustrated, the through shaft 30 is in direct drive relationship with shaft 38, differential 23, and the first or rearward rear axle 22. Consequently, the first or rearward rear axle 22 is driven full time by through shaft 30. The through shaft 30 may be used to directly engage the differential 23 for the rearward rear axle.

The drive train for driving the forward rear axle 24, hereinafter referred to as a second drive train, is also shown in FIG. 2. This second drive train comprises a pinion shaft 40 having a beveled pinion 42 at a rearward end thereof, and a ring gear 44 which is driven by the pinion 42 and which drives the forward rear axle differential 25. Pinion shaft 40 is rotatably supported in housing 26 by means of bearing assemblies 46 and 48 for rotation about a longitudinally extending axis which may be parallel to the axis of through shaft 30. The axle differential 25 and the driving relationship between the axle differential 25 and the ring gear 44 may be conventional, and so are not described in detail. In FIG. 2, only one of the two axle shafts, i.e., the right axle shaft, is shown.

Figure 3:
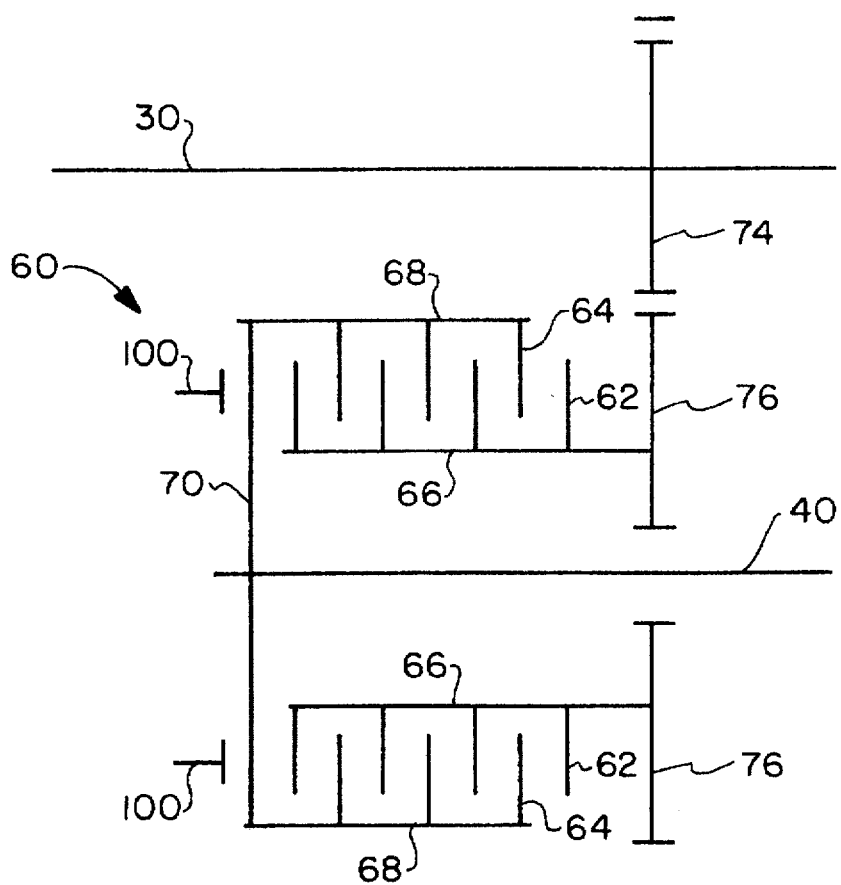
FIG. 3 is a diagrammatic illustration of a clutch pack used in the present invention.

The forward rear axle 24 the drive train therefore are placed selectively in engagement with the through shaft 30 by means of a friction clutch or clutch pack 60. The clutch pack 60 is shown pictorially in FIG. 2 and diagrammatically in FIG. 3. Clutch pack 60 is rotatably mounted inside transfer case 26 and is concentric with the pinion shaft 40. Clutch pack 60 may comprise a plurality of parallel annular disks or plates, which are arranged in first and second sets 62 and 64, respectively, in inter-leaved relationship. The first set of plates 62 are keyed along their inner circumferences to and are rotatable with a hub 66 which is driven by the through shaft 30. The second set of plates 64 are keyed along their outer circumferences to and are rotatable with a sleeve 68, which is part of an annular drum or plate 70 that is mounted for rotation with pinion shaft 40. A splined connection 72 is formed between the drum 70 and the pinion shaft 40 to permit axial movement of the drum 70 and the sleeve 68 along the axis of the pinion shaft while preventing relative rotation. Thus, drum 70, sleeve 68, and the second set of plates 64 are axially moveable relative to hub 66 and the first set of plates 62.

On the input side of clutch 60 are a first gear 74, which is fixedly mounted on through shaft 30, and a second gear 76 rotatably mounted on pinion shaft 40 and driven by gear 74. Hub 66 is integrally joined to the second gear 76 and so is rotatable therewith. Gears 74 and 76 and hub 66 and the first set of clutch disks 62 are in full time driven relationship with the through shaft 30. The clutch disks 64 of the second set are normally out of engagement with the disks of the first set, and are in frictional engagement therewith only when the clutch is engaged. Thus, the second set 64 of clutch disks, the sleeve 68, and the drive train for the forward rear axle 24 are driven only when the clutch is engaged.

Figure 4:
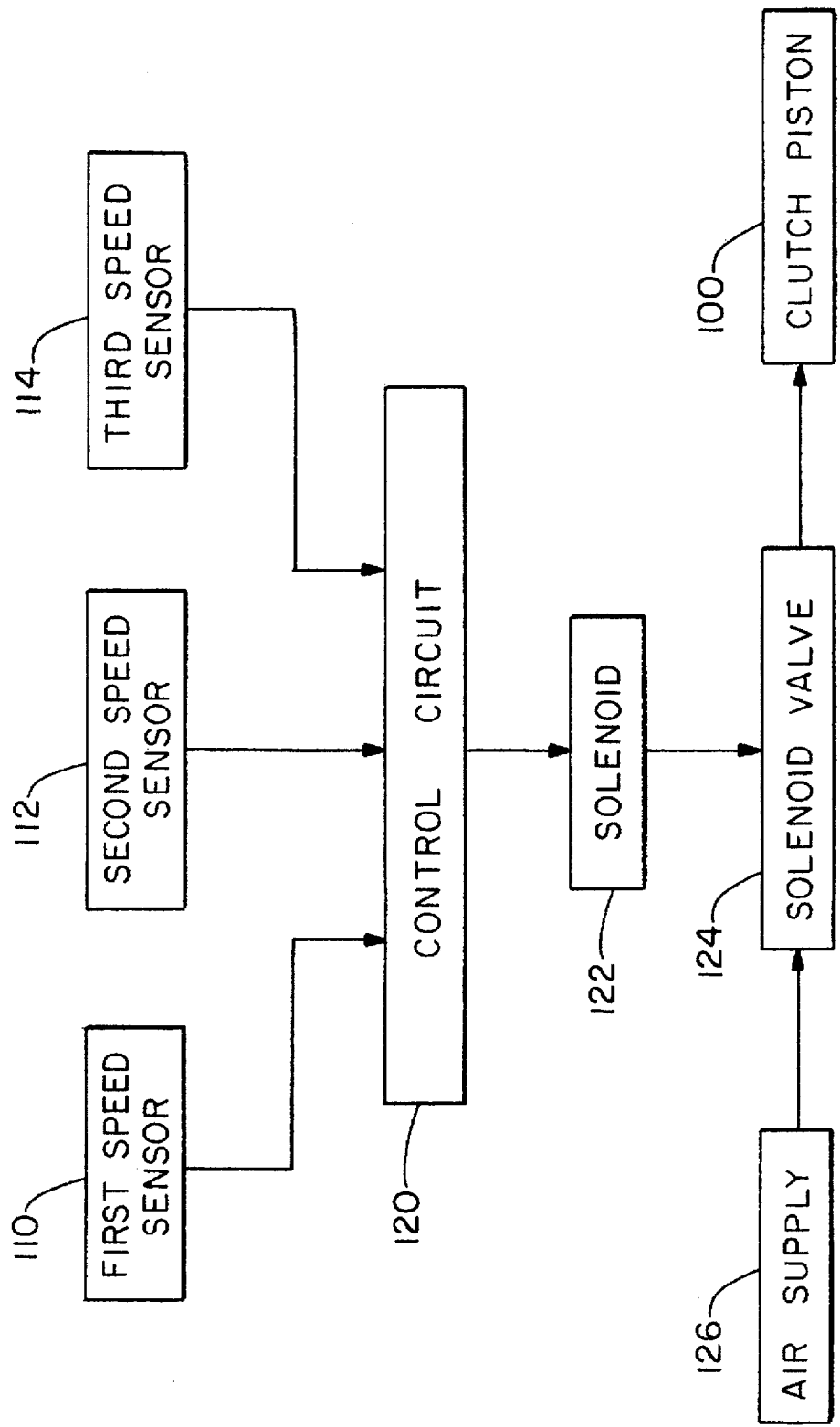
FIG. 4 is a diagrammatic illustration of a clutch actuation assembly of the present invention.

Clutch 60 is engaged by means of a clutch actuator assembly which is shown diagrammatically in FIG. 4. This clutch actuator assembly may include an axially moveable annular compression member, such as an annular clutch piston 100, which is also shown in FIG. 2. Clutch piston 100 is mounted concentrically with pinion shaft 40 and is axially moveable relative thereto. Clutch piston 100 engages drum 70, which in turn engages an end face of clutch 60. Movement of clutch piston 100 is controlled by fluid pressure, preferably compressed air introduced into an air chamber 102 in housing 26 through a port 104 in the housing. The air brake system of the vehicle 10 may serve as a source of compressed air. As will hereinafter be described in more detail, the clutch actuator may be controlled to selectively vary actuation of clutch 60 to allow the forward rear axle 24 to be driven with a predetermined torque split between axles 22 and 24. For example, the fluid pressure introduced into chamber 102 may be controlled to selectively vary the torque transferred to the forward rear axle 24 by allowing some slippage between clutch disks 62 and 64.

A pair of speed sensors 110 and 112 (which are shown in FIGS. 2 and 4) sense the rotational speeds of the rearward rear axle 22 and the forward rear axle 24 respectively. These sensors may be of known type. The first sensor 110 may be positioned to sense the rotational speed of the through shaft 30 which drives the rearward rear axle 22. The speed of through shaft 30 is proportional to the speed of the rearward rear axle 22. The second speed sensor 112 may be positioned to sense the rotational speed of the clutch drum 70, which is proportional to the rotational speed of the pinion shaft 40 and the forward rear axle 24. The rotational speeds of the two rear axles 22 and 24 are compared and the clutch 60 is engaged when the difference exceeds a predetermined limit. For example, when one of the rear axles is spinning while the other is on solid ground or pavement (which may happen on ice or snow), an output signal will be generated. Although speed sensors 110 and 112 are shown as part of the axle assembly, the rotational speeds of the axles 22 and 24 may be sensed by other sensors which may be provided for other functions. For example, an ABS braking system may be provided with the vehicle, and speed sensors associated with the braking system may be used to generate signals corresponding to the rotational speeds of the axles, which are supplied to control circuit 120. This will eliminate any duplication of such sensors if provided for other functions.

A load cell (or third sensor) 114, which is shown in FIGS. 2 and 4, may be used either alone or in conjunction with speed sensors 110, 112 to sense the thrust load generated by the helical gear associated with through shaft 30. The load cell 114 may be positioned behind the bearing set rotatably supporting shaft 30. In this manner, sensor 114 may produce a signal correlating to torque applied to the rearward rear axle. When this torque exceeds a predetermined limit, an output signal will be generated by means described hereinafter. This may occur for example when the vehicle 10 is heavily loaded or on a steep upgrade. Alternatively, torque load on an axle may be obtained from an engine control system associated with the vehicle, from which a signal representative of the amount of torque load the vehicle engine is created can be generated. This signal will also correspond to torque load on an axle, allowing the control circuit 120 to selectively actuate the clutch 60.

A preferred clutch actuator assembly in its entirety is shown diagrammatically in FIG. 4. Referring to FIG. 4, first sensor 110 and second sensor 112 (which are also shown in FIG. 2) sense the rotational speeds of the rearward rear axle 22 and the forward rear axle 24, respectively, and generate signals proportional to the respective speeds. These signals are fed to a computer control circuit 120. When this difference exceeds a predetermined value, an output signal is generated by the control circuit and is transmitted to solenoid 122. This solenoid is actuated, opening solenoid valve 124, which allows compressed air to flow from an air supply 126 (which may be an air compressor which also furnishes compressed air to a vehicle braking system) to an air chamber 102 (FIG. 2), actuating piston 100 and causing the same to move to the right as seen in FIG. 2. This engages clutch pack 60 by compressing the clutch pack between the drum 70 and gear 76. The movement of drum 70 places the disks of the clutch 60 into frictional engagement, providing a drive path through first and second gears 74 and 76, the clutch 60, and the pinion shaft 40 and the drive train for the forward rear axle 24. Consequently, both rear axles 22 and 24 are caused to rotate at the same speed. As mentioned previously, the control system 120 may be used to actuate clutch 60 to allow slippage between clutch plates 62 and 64 to vary the torque transferred to the forward rear axle 24 in the preferred embodiment. The solenoid valve 124 may be operated to produce a variable amount of bias against the disks of clutch 60 to thereby vary the amount of torque transferred between the rearward and forward rear axles 22 and 24.

Similarly, in the event of a heavy load on the through shaft 30 and the first or rearward rear axle 22, it is desirable to actuate clutch 60 so that the torque is divided between the rearward and forward rear axles 22 and 24 respectively. Accordingly, an indication of torque above a predetermined maximum, as sensed by load cell 114 or obtained from the engine control system, also causes generation of an output signal by the control circuit 120. The remainder of the actuator assembly then acts in the manner described above so the torque is applied to both rear axles.

Although a computer controlled clutch actuator is preferred, other clutch actuation clutch mechanisms may be used. Thus, the signals generated by speed sensors 110 and 112 may be fed to a non-computerized electronic comparator which will generate a signal whose voltage is proportional to the difference in speed sensed by sensors 110 and 112. When this signal exceeds a predetermined voltage, the signal may be passed through to a solenoid 122, which will cause a solenoid to operate at valve 124 to open as previously described, allowing compressed air to flow to air chamber 102, actuating piston 100. Also, a signal generated by load cell 114 or other torque related signal may be passed to an appropriate computerized electronic device which will either pass through or generate an output signal when a predetermined torque threshold as sensed by load cell 114 is exceeded. The remainder of the actuator system may be as previously described.

Load cell 114 can be omitted if desired. The preferred embodiment as shown includes such load cell so that the clutch 60 will be actuated either by a difference in forward and rearward rear axle speeds in excess of a predetermined amount, and/or by an excessive torque on the rearward rear axle.

The piston actuator system may employ hydraulic fluid under pressure or may be operated electro-magnetically if desired as an alternative to compressed air. Other clutch actuation arrangements are also contemplated.

Clutch 60 may also be actuated manually by the driver if desired. If manual actuation is provided, then such manual actuation may either replace or supplement (as a manual override) the automatic actuation system shown and described.

While the clutch 60 as shown is coaxial with the pinion shaft 40, it will be apparent that the clutch may be coaxial with through shaft 30 and that the clutch hub 66 may be keyed to rotate directly with through shaft 30, with appropriate gearing between the output sleeve 68 of clutch 60 and the pinion shaft 40. For example, gear 74 in that case may be rotatably mounted on input shaft 30 and in driving engagement with the sleeve 68 (say by making the sleeve 68 integral with gear 74), and by mounting gear 76 for rotation with pinion shaft 40. Engagement of clutch 60 would then cause gears 74 and 76, and pinion shaft 40 to be driven at the same rotational speed as input shaft 30.

The tandem rear axle assembly 20 herein has been described with particular reference to an assembly wherein the rearward rear axle 22 is the full time driven axle and is driven by direct drive, while the forward rear axle 24 is driven part time through a drive train which includes a pinion and a pinion shaft. However, it is possible to drive the forward rear axle 24 full time and the rearward rear axle 22 part time. It is also possible to drive the full time axle (say forward rear axle 24) by means of a drive train which includes a pinion shaft such as 40 and a pinion such as 42, while interposing a clutch pack between through shaft 30 and an output shaft (say shaft 38) axially aligned therewith for driving the part time rear axle (say rearward rear axle 22).

Other modifications will be apparent to those skilled in the art.

The operation of the preferred tandem rear axle assembly herein will now be briefly described.

Under normal operating conditions, e.g., a dry road, clutch 60 is disengaged, and the second drive train comprising pinion shaft 40 and pinion 42, leading to the forward rear axle (or second axle) 24 are likewise disengaged. The forward rear axle receives no torque and is a "dead" axle. All torque from through shaft 30 is transmitted to the rearward rear axle 22 through the through shaft 30 and output shaft 38, which is axially aligned with the through shaft 30.

Under adverse conditions, such as snow or ice, or high torque, one or both sets of wheels mounted on one of the rear axles, may lose traction and spin. The speed of the through shaft 30 will now increase. There will be no corresponding increase in the speed of the forward rear axle 24, whose speed is determined by the over-the-road speed of the vehicle 10. The difference between the speeds sensed by sensors 110 and 112 will exceed the predetermined limit. As a result, the clutch 60 will be actuated, and torque will be divided between the shaft 38 and the rearward rear axle 22 on the one hand, and the pinion shaft 40 and the forward rear axle 24 on the other. About one half of the torque from the through shaft 30 will be supplied to the rearward rear axle 22 and the other half will be supplied to the forward rear axle 24 through pinion shaft 40.

In the preferred embodiment, the use of an annular disk-type friction clutch, or clutch pack, instead of a dog clutch comprising a pair of relatively slidable members each having teeth allows a much smoother transition from single axle drive to two axle drive (or vice versa). Such increased smoothness is achieved whether the shift from one axle drive to two axle drive or vice versa is controlled automatically or manually by the driver. The invention also eliminates the need for interaxle gearing. The invention also allows automatic control of the drive axles to provide traction control and better torque distribution. In particular, a tandem axle assembly which employs speed sensors for determining speeds of both axles, and optionally a load cell for determining torque on the full time or rearward rear axle, and a clutch pack which is engaged when a difference between axle speeds is in excess of predetermined levels or an excessive torque is applied to the full time axle, results in smooth and highly reliable operation.

While the foregoing description has set forth the preferred embodiment of the invention, it is understood that numerous modifications, substitutions, and changes can be undertaken without departing from the true scope and spirit of the present invention as defined by the appended claims.

What is claimed is:

1. A tandem rear drive axle assembly for an automotive vehicle, said tandem rear drive axle assembly comprising
   (a) a first rear axle;
   (b) a second rear axle which is axially spaced from said first rear axle;
   (c) a longitudinally extending input shaft adapted to be in driving engagement at one end with a vehicle drive shaft and at a second end with a first drive train for said first rear axle;
   (d) said first drive train and said first rear axle being in full time driving engagement with said input shaft;
   (e) a second drive train for said second rear axle, said second drive train including a pinion shaft which is spaced from and parallel to said input shaft and is in driving engagement with said second rear axle, said second drive train being adapted to be placed selectively into and out of engagement with said input shaft;
   (f) a clutch pack for selectively engaging and disengaging said second drive train, said clutch pack comprising a plurality of parallel annular disks arranged in interleaved first and second sets, the disks of said first set being in full time driven relationship with said input shaft, and the disks of said second set drivingly engaging said pinion shaft, and
   (g) a clutch actuator assembly for actuating said clutch pack, said clutch actuator assembly comprising:
      (1) first and second speed sensors for sensing the rotational speeds of said first axle and said second axle respectively;
      (2) a control device for generating an output signal when the difference in rotational speeds of said first and second axles, as sensed by said speed sensors, exceeds a predetermined limit;
      (3) an axially moveable annular compression member disposed adjacent to an end face of said clutch pack, said compression member being actuated in response to said output signal to compress said clutch pack and thereby place said second drive train and said second axle in driving relationship with said input shaft so that torque is transmitted simultaneously to said first and second axles.

2. A tandem rear drive axle assembly according to claim 1 wherein said first axle is a rearward rear axle and said second axle is a forward rear axle, the input shaft is a through shaft, and said first drive train is in direct drive relationship with said through shaft.

3. A tandem rear drive axle assembly according to claim 2 wherein said first drive train includes a shaft which is coaxial with and in direct drive relationship with said through shaft.

4. A tandem rear drive axle assembly according to claim 2 wherein said second drive train further comprises a pinion at a rearward end of said pinion shaft, and a ring gear driven by said pinion, and wherein said pinion shaft and said input shaft are rotatable about parallel axes.

5. A tandem rear drive axle assembly according to claim 4 wherein said clutch pack is concentric with said pinion shaft.

6. A tandem rear drive axle assembly according to claim 5 wherein said clutch pack further comprises a hub which is driven by said input shaft and a sleeve which is non-rotatably mounted on said pinion shaft, said hub and said sleeve being concentric with said pinion shaft, said first set of disks being keyed to and rotatable with said hub, said second set of disks being keyed to and rotatable with said sleeve.

7. A tandem rear drive axle assembly according to claim 6, said tandem axle assembly further comprising a first gear non-rotatably mounted on said input shaft and a second gear driven by said first gear, said hub being integrally joined to said second gear.

8. A tandem rear drive axle assembly according to claim 7 wherein said first gear is fixably mounted on said input shaft and said sleeve is integrally joined to an annular drum, said annular drum being in splined engagement with said pinion shaft so that said annular drum and said sleeve are axially moveable but not rotatable with respect to said pinion shaft.

9. A tandem rear drive axle assembly according to claim 1 wherein said clutch pack is actuated by fluid pressure, said compression member is a piston disposed in a chamber for receiving fluid under pressure and said clutch actuator assembly includes a solenoid-operated valve for selectively admitting fluid under pressure to said chamber.

10. A tandem rear drive axle assembly according to claim 9 wherein said fluid pressure is air pressure.

11. A tandem rear drive axle assembly according to claim 1 wherein said actuator assembly further comprises a load sensor for sensing the torque applied to said first axle, and wherein said control device is further capable of generating an output signal when said load sensor indicates a torque in excess of a predetermined limit.

12. A tandem rear drive axle assembly according to claim 11 wherein said load sensor is a load cell which senses torque applied to said input shaft.

13. A tandem rear drive axle assembly according to claim 1 wherein said control device is computer controlled.

14. A tandem rear drive axle assembly according to claim 1 wherein said first axle is a rearward rear axle and said second axle is a forward rear axle.

15. A tandem rear drive axle assembly according to claim 14 wherein said pinion shaft has a pinion attached to a rearward end thereof, and wherein said second drive train further includes a ring gear driven by said pinion.

16. A tandem rear drive axle assembly according to claim 14 wherein said clutch pack is concentric with one of said input shaft and said pinion shaft.

17. A tandem rear drive axle assembly according to claim 16 wherein said clutch pack further includes a hub which is driven by said input shaft and a sleeve which drives said pinion shaft, said first of disks being keyed to and rotatable with said hub, said second set of disks being keyed to and rotatable with said sleeve.

* * * * *